United States Patent Office 3,701,664
Patented Oct. 31, 1972

3,701,664
PROCESS FOR HARDENING LIGHT-SENSITIVE PHOTOGRAPHIC LAYERS CONTAINING GELATINE
Bernhard Piller, Marly-le-Petit, and Karl Seitz, Oberwil, Basel-Land, Switzerland, assignors to Ciba-Geigy AG, Basel, Switzerland
No Drawing. Continuation of abandoned application Ser. No. 796,570, Feb. 4, 1969. This application May 25, 1971, Ser. No. 146,853
Claims priority, application Switzerland, Feb. 9, 1968, 1,927/68
Int. Cl. G03c 1/30
U.S. Cl. 96—111   12 Claims

ABSTRACT OF THE DISCLOSURE

Colorless halogeno pyrimidines and halogeno-1,3,5-triazines containing no free acidic groups are used for hardening light sensitive gelatine layers.

---

This application is a continuation of application Ser. No. 796,570 filed Feb. 4, 1969, now abandoned.

The present invention provides a process for hardening light-sensitive photographic layers containing gelatine, wherein the hardening agent used is a colourless compound which is free from acidic groups and contains at least one six-membered heterocycle comprising three or four carbon atoms and three or two nitrogen atoms, at least one halogen atom linked with a carbon atom of the 6-membered ring and at least one organic residue linked with the heterocycle directly or through an oxygen or a sulphur atom.

Suitable compounds are, for example, pyridazine, pyrimidines, pyrazines or 1,3,5-triazines. The compounds of the following general formulae may be mentioned:

(1) 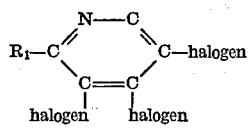

(2) 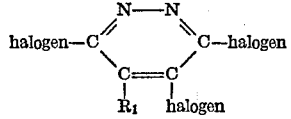

(3) 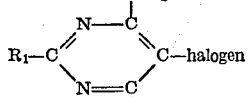

(4) 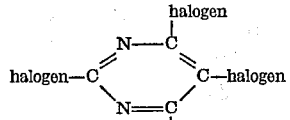

(5) 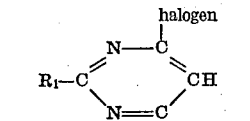

(6) 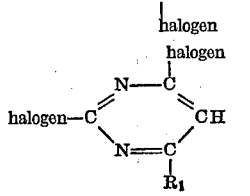

(7), (8), (9) 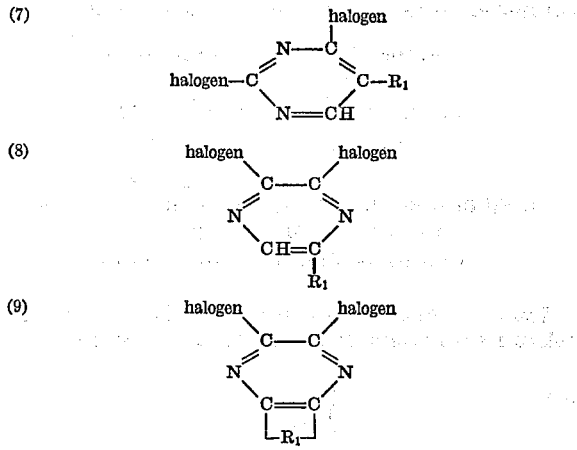

in which $R_1$ represents an organic residue which is free from acidic groups. $R_1$ may be linked with the heterocyclic 6-membered ring directly or through an oxygen or a sulphur atom. In the case of the Formula 9 the organic residue $R_1$ converts a dihalogenopyrazine is a dihalogenoquinoxaline ring.

Those compounds are preferred which contain at least one halogeno-1,3,5-triazine or halogenopyrimidine residue. Quite generally, compounds for example, containing bromine atoms or especially chlorine atoms linked with the six-membered heterocycle may be used.

Among the halogeno-1,3,5-triazines and halogenopyrimidines special mention must be made of the compounds of the formulae (10a) 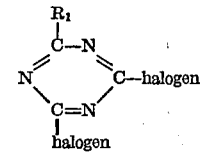

and (10b) 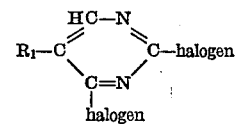

in which $R_1$ has the above meaning. The residue $R_1$ is advantageously a hydrogcarbon residue which is unsubstituted or substituted by halogen atoms, alkyl, alkoxy, aryl, arylory, aralkyl, aralkoxy, nitrile, hydroxyl, carbalkoxy, alkenyl, secondary or tertiary amino groups and/or a further 1,3,5-triazine or pyrimidine residue, the said hydrocarbon residue being bound to the triazine or pyrimidine ring directly or through an oxygen or a sulphur atom. Aliphatic or araliphatic hydrocarbon residues, or a hydrocarbon residue of the benzene or naphthalene series, are preferred. For example, two dichlorotriazines may be linked together through an organic residue which in this case is, for example, an alkylene residue which is linked with the triazine residues directly or through an oxygen or a sulphur atom.

The organic residues $R_1$ in the Formulae 1 to 10 like the heterocyclic compound itself must be free from acidic groups and may, for example, be a residue of the following formulae $-CH_3$, $-OCH_3$, $-SCH_3$, $-CH_2CH_3$, $-OCH_2CH_3$ $-OCH_2CH_2CH_2CH_3$, $-CH\begin{smallmatrix}CH_3\\CH_3\end{smallmatrix}$, $-CH_2Cl$, $-OCH\begin{smallmatrix}CH_3\\CH_3\end{smallmatrix}$

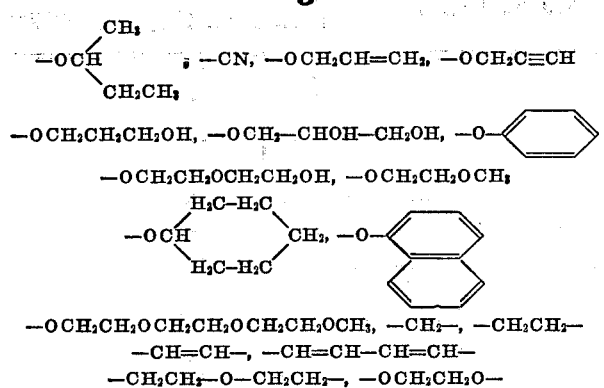
Thus, for example, according to this invention dichloro-1,3,5-triazines of the Formulae 11 to 30
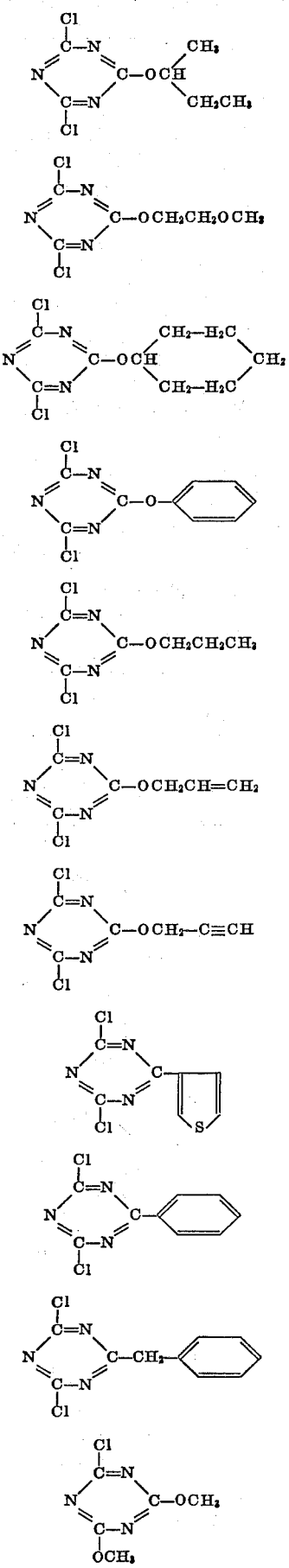

(30)
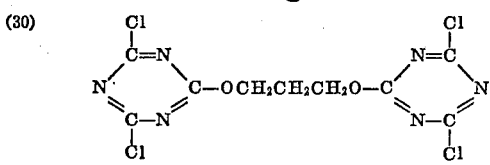

and the following pyrimidines may be reacted with gelatine:

(31)
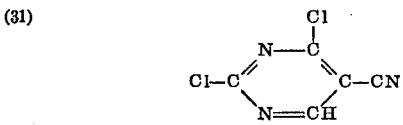

(32)
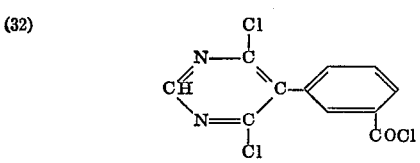

The heterocyclic compounds required in the present process can be manufactured by known methods.

Thus, for example, compounds of the above-mentioned kind in which the organic residues are linked with the six-membered heterocycle through oxygen atoms may be manufactured from easily accessible starting materials by simple processes. Cyanuric chloride may be reacted, for example, in an aqueous solution in the presence of sodium hydrogen carbonate with the corresponding alcohol (J. Am. Chem. Soc. 73, p. 2989 (1951)), or a mixture of cyanuric chloride and acetone may be reacted with the corresponding alcohol in the presence of collidine. The corresponding mercapto compounds are accessible in an analogous manner (Recueil des travaux chimiques des Pays-Bas 78, p. 967 (1959)). Compounds in which the organic residues are linked directly with the six-membered heterocycle are most advantageously manufactured by reacting cyanuric chloride with the corresponding Grignard compound, or from trichloromethylisocyanide dichloride and the corresponding amidines (Helv. Chim. Acta 33, p. 1365 (1950); Journal of the Chemical Society 1965, p. 1113; German patent specification No. 1,178,437). The compound of the Formula 31 may be manufactured as described in Collect. Czechoslov. Chem. Commun. 31, pp. 3990–4001 (1966).

The halogen atoms of the compounds of Formulae 1 to 32 react with the hydroxyl, mercapto, amino or imino groups of gelatine with formation of homopolar bonds. In general, the reaction between gelatine and these compounds proceeds smoothly in the usual manner. As a rule, they are sufficently soluble in water or in water-miscible, photographically inactive, organic solvents for example acetone, methanol, ethanol or dimethylformamide. Thus, for example, it is essential that these compounds can be dispersed in 0.1 to 10% aqueous gelatine solutions in such a manner that they do not settle out in crystalline form.

In most cases it suffices to add the products to be used according to this invention in the form of a solution in a water-miscible solvent to an aqueous gelatine solution with vigorous stirring, although the conventional dispersing methods by means of kneading and/or shearing or ultra-sound may also be used.

Thus, for example, a solution of the hardener in water, ethanol or methanol may be added to the gelatine at room temperature or a slightly higher temperature and the gelatine containing silver halide and/or other materials needed for producing photographic images poured over a base in the usual manner to form a layer which, if desired, may be dried. The layer can then be left for a certain time, for example up to 18 hours, at an elevated temperature or at room temperature whereby hardening sets in rapidly and progressively; the melting point of the gelatine rises considerably, for example by 25 to 60° C. The amount of hydrohalic acid released during the hardening is, in view of the actual proportions of the two reactants, so small that it is completely buffered by the excess of gelatine present so that the pH value of the gelatine is practically unaffected by the hardener.

The desired degree of hardening can be advantageously controlled by varying the amount of hardener used and is advantageously from 0.25 to 5% referred to the weight of dry gelatine. The hardening of the gelatine is obviously caused by an extensive cross-linking. The hardening affects neither the photographic properties of the photosensitive layers nor the reactivity of dye couplers or dyes.

A special advantage of the hardeners to be used in the present process is that when used in a low concentration they impart an adequate degree of hardness to the gelatine layers even after 18 to 24 hours so that the quality of the cast layers can be inspected by a test processing immediately after their manufacture even at an elevated temperature or in vigorous treatment baths.

The compounds of the Formulae 1 to 32 are equally suitable for hardening interlayers in multilayer materials, for example separating layers, filter layers, coatings, substrations or baryta coatings.

The compounds having a relatively low molecular weight, for example compounds of the Formulae 11 to 32 may, by virtue of their good diffusibility in a multilayer material, be added only to the interlayers and a hardening of the vicinal silver halide layers effected by diffusion. However, with increasing molecular weight, comparable compounds are less diffusible when used in photographic layers. In the manufacture of multilayer materials this property has several considerable advantages. It is known that when casting multilayers, either wet-on-solidified or wet-on-dry, the hardener always diffuses from the upper into the lower layers so that the lower layers are hardened more extensively than those above. As a result of such differential hardening the layers detach themselves or wrinkles appear when such materials are being developed. The use of sluggishly diffusing hardeners prevents this harmful migration of the hardener in multilayer materials. On the other hand, such sluggishly diffusing compounds also make it possible to harden each individual layer differently by varying the quantity of hardener used; this is of importance, for example, for the manufacture of multilayer materials in which the emulsion layers contain dyes or dye formers. Additives of this kind can cause a dissimilar lowering of the melting points of the gelatine layers, and this can be compensated by suitably increasing the amount of hardener added to the individual layer. The low diffusing hardeners of the composition indicated also bring about a more extensive hardening of the protective coating, the so-called overcast, than of the emulsion layers underneath it without affecting the hardening of the latter.

The following examples illustrate the invention. Unless otherwise indicated, parts and percentages are by weight.

EXAMPLE 1

10 ml. of a 10% aqueous gelatine solution are mixed with 0.6 ml. of a 1% methanolic solution of the compound of the Formula 17. The solution is poured over a plate of glass 18 x 24 cm. and this plate is dried in circulating air at 32° C. After 24 hours' storage the melting point is above 90° C.

EXAMPLE 2

1 kg. of silver bromide emulsion containing 10% of gelatine is mixed with 50 ml. of a 1% acetone solution of the compound of the Formula 15, cast on a film base and dried. After 15 hours' storage at 43° C. (relative atmospheric humidity 69%) the layer melts above 90° C.

The results obtained by hardening aqueous gelatine with the compounds of the Formulae 11, 15 to 25, 27 to 32 are listed in the following table.

| Example | Formula | Percent referred to gelatine | 1% solution in— | Melting point in ° C. after— | | |
|---|---|---|---|---|---|---|
| | | | | 24 hrs. | 48 hrs. | 96 hrs. |
| 1 | 17 | 0.6 | Methanol | >90 | >90 | >90 |
| 2 | 15 | 0.5 | Acetone | ¹>90 | ¹>90 | ¹>90 |
| 3 | 11 | 0.6 | Methanol | 88 | 90 | >95 |
| 4 | 16 | 0.6 | ___do___ | 90 | 90 | >95 |
| 5 | 18 | 0.6 | ___do___ | 90 | 90 | 90 |
| 6 | 19 | 0.6 | ___do___ | 70 | >95 | >95 |
| 7 | 21 | 0.6 | ___do___ | 70 | 85 | 90 |
| 8 | 22 | 0.6 | ___do___ | 40 | 47 | 86 |
| 9 | 23 | 5.6 | Ethanol | >95 | >95 | >95 |
| 10 | 24 | 0.6 | Methanol | >95 | >95 | >95 |
| 11 | 25 | 0.6 | ___do___ | >95 | >95 | >95 |
| 12 | 20 | 0.6 | Ethanol | 70 | >95 | >95 |
| 13 | 27 | 5.6 | Acetone | >95 | >95 | >95 |
| 14 | 28 | 5.6 | Ethanol | 94 | >95 | >95 |
| 15 | 29 | 5.6 | Acetone | ²>95 | ²>95 | ²>95 |
| 16 | 30 | 5.6 | ___do___ | >95 | >95 | >95 |
| 17 | 31 | 5.6 | Methanol | >95 | >95 | >95 |
| 18 | 32 | 5.6 | Acetone | ³>95 | ³>95 | ³>95 |

¹ After 15 hours at 43° C. (relative atmospheric humidity 69%).
² At 43° C. (relative humidity 69%).
³ After 5 hours at 43° C. (relative humidity 69%).

We claim:
1. A process for hardening silver halide light-sensitive photographic layers containing gelatine, which comprises incorporating in the gelatine as a hardening agent 0.25 to 5%, referred to the weight of the dry gelatine of a colorless compound free from acidic groups selected from the group consisting of 1,3,5-triazine, pyrimidine, pyridazine and pyrazine having at least one chlorine or bromine atom linked with a carbon atom of said compound and at least one hydrocarbon radical which is unsubstituted or substituted by halogen, alkyl, alkoxy, aryl, aryloxy, aralkyl, aralkoxy, nitrile, hydroxyl, carbalkoxy, alkenyl, secondary or tertiary amino and/or a further 1,3,5-triazine or pyrimidine radical, the said hydrocarbon radical being bound to a carbon atom of said compound directly or by an oxygen or sulfur atom.

2. A process as claimed in claim 1, which comprises incorporating in the gelatine a hardening agent selected from bromo or chloro-1,3,5-triazine or a chloro or bromo pyrimidine having at least one hydrocarbon radical which is unsubstituted or substituted by halogen, alkyl, alkoxy, aryl, aryloxy, aralkyl, aralkoxy, nitrile, hydroxyl, carbalkoxy, alkenyl, secondary or tertiary amino and/or a further 1,3,5-triazine or pyrimidine radical, the hydrocarbon radical being bound to a carbon atom of said compound directly or by an oxygen or a sulfur atom.

3. A process as claimed in claim 1 which comprises incorporating in the gelatine a hardening compound selected from bromo or chloro-1,3,5-triazine and bromo- or chloro-pyrimidine said compound having as a substituent at least one of cycloalkyl, cyano, phenyl, naphthyl, thiofuranyl, alkenyl, alkynyl, alkyl or alkyl substituted by chloro, hydroxyl, alkoxy, hydroxyalkoxy, phenyl or dichloro-1,3,5-triazinyl-4-oxyalkylene, said substituent being bound to a carbon atom of the triazine or pyrimidine group either directly or by an oxygen or sulfur atom.

4. A process as claimed in claim 1, which comprises incorporating in the gelatine as a hardening agent a compound of the formula

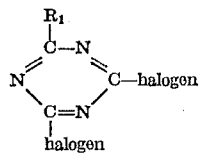

wherein $R_1$ represents a hydrocarbon radical which is unsubstituted or substituted by halogen, alkyl, alkoxy, aryl, aryloxy, aralkyl, aralkoxy, nitrile, hydroxyl, carbalkoxy, alkenyl, secondary or tertiary amino and/or a further 1,3, 5-triazine or pyrimidine radical, said hydrocarbon radical being bound to said compound directly or by an oxygen or sulfur atom, and halogen is chlorine or bromine.

5. A process as claimed in claim 1, which comprises incorporating in the gelatine as a hardening agent a compound of the formula

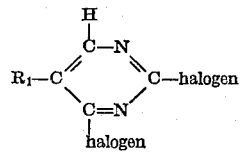

wherein $R_1$ represents a hydrocarbon radical which is unsubstituted or substituted by halogen, alkyl, alkoxy, aryl, aryloxy, aralkyl, aralkoxy, nitrile, hydroxy, carbalkoxy, alkenyl, secondary or tertiary amino and/or a further 1,3,5-triazine or pyrimidine radical, said hydrocarbon radical being bound to said compound directly or by an oxygen or sulfur atom, and halogen is chlorine or bromine.

6. A process as claimed in claim 1, which comprises incorporating in the gelatine as a hardening agent a compound of the formula

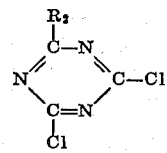

wherein $R_2$ represents a hydrocarbon radical which is unsubstituted or substituted by halogen, alkyl, alkoxy, aryl, aryloxy, aralkyl, aralkoxy, nitrile, hydroxyl, carbalkoxy, alkenyl, secondary or tertiary amino and/or a further 1,3,5-triazine or pyrimidine radical, said hydrocarbon radical being bound to the triazine ring directly or by an oxygen or sulfur atom.

7. A process as claimed in claim 1, which comprises incorporating in the gelatine as a hardening agent a compound of the formula

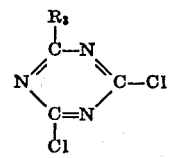

wherein $R_3$ represents a hydrocarbon radical bound to the triazine ring directly or by an oxygen or a sulfur atom and carrying as a substituent at least one member selected from the group consisting of a halogen atom, an alkoxy group, an aralkyl group, an aralkoxy group, a nitrile group, a hydroxyl group, a carbalkoxy group an alkenyl group, a secondary amino group, a tertiary amino group and a further 1,3,5-triazine ring.

8. A process as claimed in claim 1, which comprises incorporating in the gelatine as a hardening agent the compound of the formula

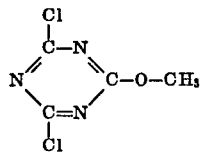

9. A process as claimed in claim 1, which comprises incorporating in the gelatine as a hardening agent the compound of the formula

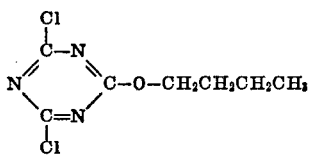

10. A process as claimed in claim 1, which comprises incorporating in the gelatine as a hardening agent the compound of the formula

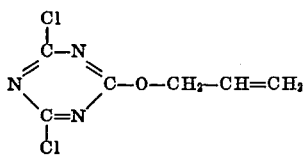

11. A process as claimed in claim 1, which comprises incorporating in the gelatine as a hardening agent the compound of the formula

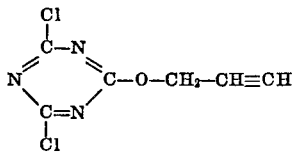

12. A process as claimed in claim 1, which comprises incorporating in the gelatine as a hardening agent a compound of the formula

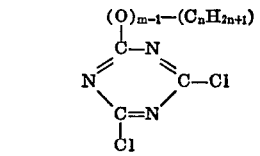

wherein $m$ and $n$ each represents a whole number, $m$ being at most 2 and $n$ at most 4.

References Cited
UNITED STATES PATENTS

| | | | |
|---|---|---|---|
| 3,138,461 | 6/1964 | Ryan | 96—111 |
| 3,288,775 | 11/1966 | Anderau et al. | 96—111 |
| 3,325,287 | 6/1967 | Yamamoto et al. | 96—111 |

NORMAN G. TORCHIN, Primary Examiner

R. E. FICHTER, Assistant Examiner

U.S. Cl. X.R.

106—125; 260—117